Jan. 13, 1953 L. G. LINDSAY 2,625,166
VALVE MECHANISM
Filed Jan. 23, 1946 2 SHEETS—SHEET 1
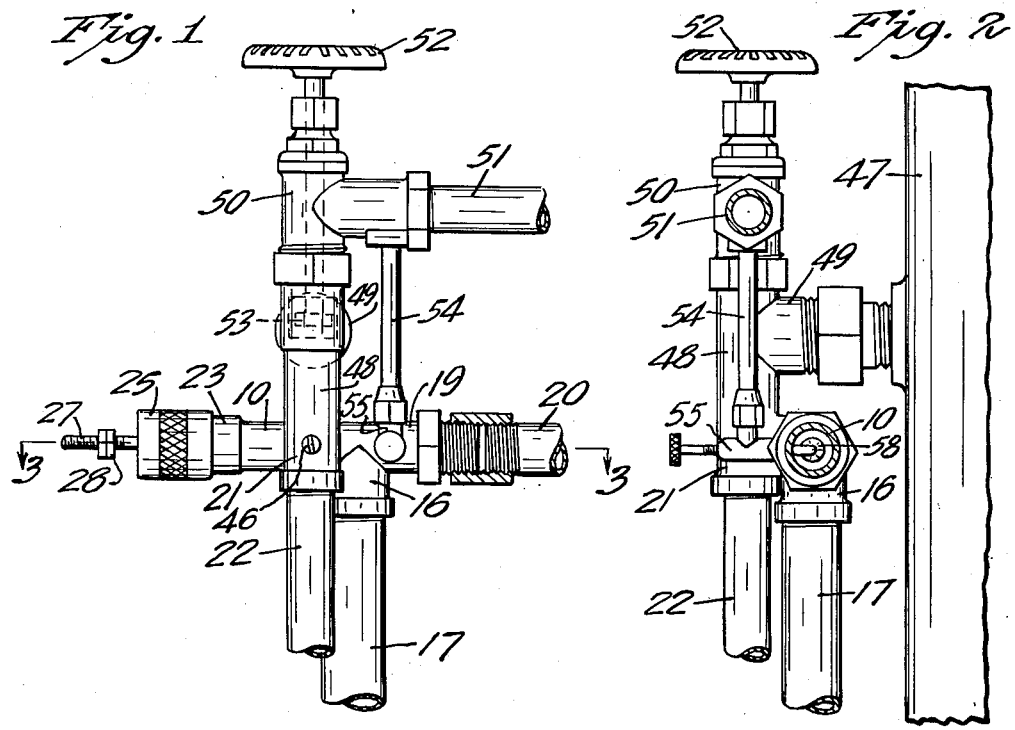
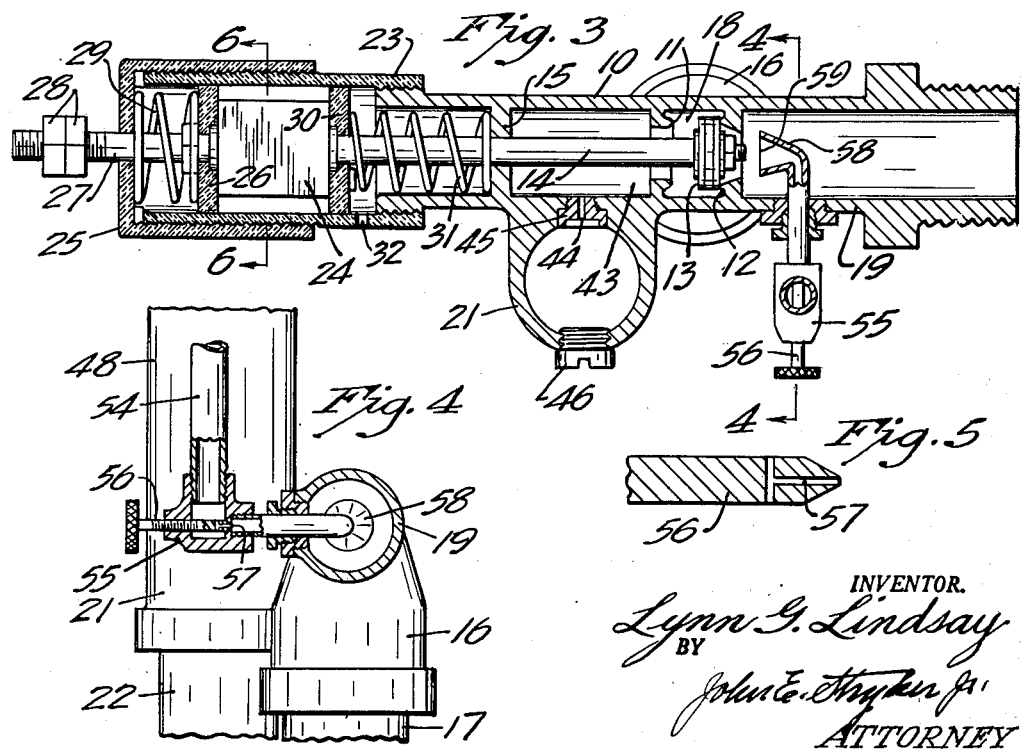
INVENTOR.
Lynn G. Lindsay
BY John E. Stryker Jr.
ATTORNEY

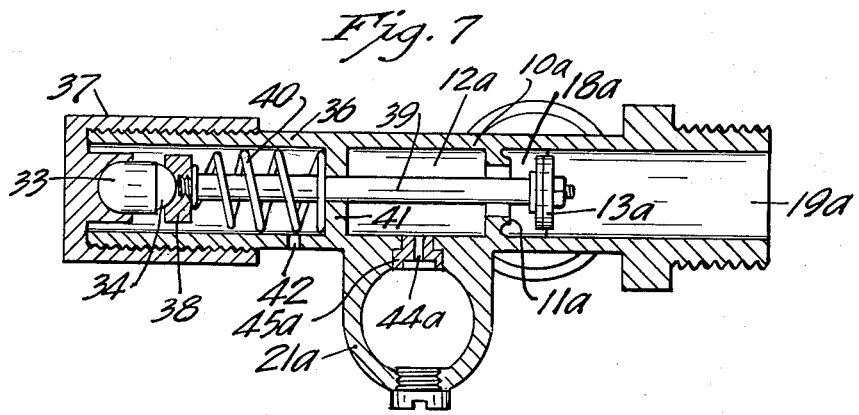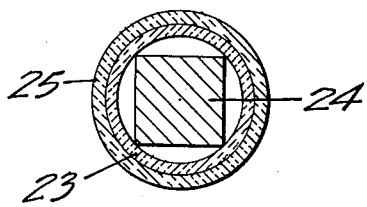

Patented Jan. 13, 1953

2,625,166

UNITED STATES PATENT OFFICE 2,625,166

VALVE MECHANISM

Lynn G. Lindsay, St. Paul, Minn., assignor to Lindsay Company, St. Paul, Minn., a corporation of Minnesota Application January 23, 1946, Serial No. 642,847

3 Claims. (Cl. 137—67)

This invention relates to valve mechanism of the type adapted to be set in one position manually to control the flow of a fluid through a conduit and having simple means for automatically cutting off the flow or changing the direction of flow after the elapse of a predetermined period of time.

It is an object of the invention to provide valve mechanism of this type with a simple timing element which is separated from the fluid flowing in the valve and adapted to perform its function irrespective of the character, temperature, pressure or velocity of the fluid under control.

Another object is to provide in association with a valve operating member a time control body which is out of contact with the gas or liquid under control and subject to sudden collapse or reduction in size upon the elapse of a predetermined period of time.

A further object is to provide a time control of the class described for a three-port, two-way valve particularly, although not exclusively, adapted for use in connection with low cost water softening apparatus.

Other objects will appear and be more fully pointed out in the following specification and claims.

The present device is an improvement on the valves described in U. S. Patents No. 1,964,302, granted June 26, 1934, to Melvin Shetler, No. 2,292,801, granted August 11, 1942, to Kemper Slidell and in my Patents Nos. 2,347,202, 2,347,203 and 2,347,204, granted April 25, 1944. In all of such valves movement of the closure member to a selected position is under control of a dissolvable body such as a hard candy ball which is placed in the valve casing where the liquid under control causes the dissolution of the body gradually by contact therewith. Obviously the rate of dissolution of the control body is dependent on the composition of the liquid flowing in the valve and varies with other factors such as the velocity and temperature of the liquid directed against the dissolvable body. Consequently there is a wide variation in the time required to dissolve the control body in different installations and under differing temperature conditions. Attempts to compensate for these variations by storage of the control bodies under refrigeration in warm weather or by varying the size of the control bodies, or by controlling the rate of flow of the liquid to the chamber containing the dissolvable body have not been entirely successful. According to the present invention, I provide control bodies which are subject to reduction in size or collapse in a holder which is separated by a substantially fluid impervious wall from the valve passages for conducting the fluid under control and the detrimental effect of variations in atmospheric conditions is also minimized.

Examples of control bodies for my purposes are ice cubes or bodies of solid carbon dioxide of convenient size which may be placed in heat insulated holders separated from the main valve casing and operatively connected to the movable valve member. Another preferred control body may comprise a capsule having a wall or walls formed from a soluble or reactive material and confining a small body of a substance which will attack or dissolve the wall material. Such capsules are particularly desirable for my purposes because they are subject to sudden collapse at the end of a period of time which may be predetermined accurately. A valve controlled by a body of this type may be held in a predetermined position and then caused to move quickly and automatically to another position upon the elapse of the time required for the reaction between the capsule walls and contents. In other cases it may be desirable to use as the control body a solid chemical compound or mixture of reactive substances which will be reduced in size by mere exposure to air or by reaction with a reagent which is brought in contact with the body when the valve is set in its initial position.

The invention will be best understood by reference to the accompanying drawings which illustrate, by way of example and not for the purpose of limitation, preferred embodiments of my invention.

In the drawing:

Figure 1 is a front elevational view showing one form of my valve mechanism together with suitable connections for water softening apparatus;

Fig. 2 is a side elevational view of the same;

Fig. 3 is a longitudinal section taken approximately on the line 3—3 of Fig. 1;

Fig. 4 is a cross section taken approximately on the line 4—4 of Fig. 3;

Fig. 5 is a fragmentary longitudinal section through the needle valve member of my device;

Fig. 6 is a cross section taken on the line 6—6 of Fig. 3;

Fig. 7 is a longitudinal section through another form of my valve mechanism employing a time control body of the capsule type, and Fig. 8 is a longitudinal sectional view of the capsule.

In the drawing (Figs. 1–4) the numeral 10 indicates the main casing member of the valve which is formed with suitable passages for conducting the fluid and parallel seats 11 and 12 for engagement with a movable head 13 constituting a closure member. This head is mounted on an end of a longitudinally movable rod 14 having a bearing 15 formed in the casing. A branch 16 of the casing 10 is connected to a fluid supply pipe 17 and arranged to conduct the fluid to a port 18 opening between the valve seats 11 and 12. An outlet end portion 19 of the casing 10 is adapted to be connected to a service pipe 20 (Fig. 1) and a side branch 21 is adapted to be connected to a drain pipe 22.

Extending beyond the bearing 15 to the left of the branch 21 (Fig. 3), the casing 10 is formed with a threaded end portion upon which is mounted a holder 23 for a time control body 24. A removable cap 25 having a screw thread connection with the holder 23 allows access to the interior of the holder. Mounted on the cap 25 is a follower 26 adapted to bear against the outer end surface of the body 24. This follower is carried on the inner end of an axially disposed pin 27 which projects to the exterior of the cap 25 and is provided with adjustable lock nuts 28 to limit movement of the follower. A spring 29 is confined between the inner surface of the cap 25 and follower 26 to urge the latter toward the body 24. Thrust may be transmitted from the body 24 to the valve rod 14 through a heat insulating head 30 which is attached to an end of the rod 14 and held in contact with the body 24 by a spring 31 confined between the bearing 15 and head 30. Where the body 24 is composed of ice, solid carbon dioxide or other material subject to reduction in size upon the absorption of heat, the holder 23, cap 25 and heads 26 and 30 are preferably constructed from a suitable heat insulating material which minimizes the effect of variations in room temperature. A minute drain hole 32 may be provided in the bottom of the holder 23 to allow the escape of any liquid that may leak past the bearing 15 along the rod 14 and thereby prevent variations in the rate of reduction of the body 24 due to contact with the liquid escaping from the valve casing. The spring 29 is stiffer than the spring 31 so that during the gradual reduction of the body 24 the spring 31 cannot expand and allow movement of the head 13 away from the seat 12 until the spring 29 has expanded to the limit permitted by the rod 27 and lock nuts 28.

In Fig. 7 I have illustrated an arrangement whereby a control body which will collapse suddenly and is not materially affected by room temperatures may be used instead of the body 24. In this case a capsule having telescoping wall members 33 and 34 is filled with a substance 35 (Fig. 8) adapted to dissolve or otherwise attack the wall members 33 and 34 to cause collapse of the capsule after the elapse of a predetermined period of time. Such a capsule is shown in a holder 36 having a removable cap 37. In use it is held under compression between the cap 37 and a head 38 mounted on a valve actuating rod 39 and a coiled spring 40 is confined under compression between the head 38 and a bearing wall 41 separating the holder 36 from the passages for fluid in a valve casing 10a.

Formed in the casing 10a is a valve seat 11a and an inlet port 18a at one side of the seat 11a. At the opposite side of the seat 11a a passage 12a extends to an outlet branch 21a of the casing. A valve head 13a is mounted on the rod 39 for engagement with the seat 11a and there is a second outlet passage 19a in continuous communication with the port 18a so that when the head 13a is closed against the seat 11a fluid may pass from the port 18a through the passage 19a to a conduit connected thereto. In the absence of a capsule in the holder 36, the spring 40 retains the valve head 13a in closed relation to the seat 11a, thus cutting off communication between the branch 21a and the inlet port 18a.

Where the wall members 33 and 34 of the capsule are made of material which is soluble in the liquid under control in the valve casing, a drain hole 42 may be formed in the bottom of the holder 36 to prevent any liquid which may leak past the bearing 41 from reaching the capsule in the holder 36.

Further referring to the structure shown in Fig. 3, when the valve head 13 is in the open position with respect to its seat 11, the inlet port 18 is in communication with the outlet or drain branch 21 through a passage 43 and restricted orifice 44. The later orifice is preferably formed in a screw threaded plug 45 which is accessible through an opening in the opposite wall of the branch 21 and the latter opening is normally closed by a screw threaded plug 46. Plugs 45 formed with orifices 44 of several different sizes are provided so that any particular installation may have an orifice 44 of proper size to allow the fluid to flow to the drain outlet at a desirable rate depending on the fluid pressure in the passage 43 when the head 13 is open with respect to the seat 11. By a similar arrangement the rate of flow through an orifice 44a, Fig. 7, may be controlled.

For installations where the valve mechanism hereinbefore described is to be applied to water softening apparatus having a tank 47 (Fig. 2) containing the water softening material, the valve casing 10 may be provided with an upwardly extending branch 48 in continuation of the outlet branch 21 and a laterally extending branch 49 of the branch 48 may be connected to the upper portion of the tank 47. I have further shown a valve indicated generally by the numeral 50 arranged to control the flow of hard water from a supply pipe 51 to the tank 47 through the branch 49. The valve 50 has a manually operable handle 52 for operating a valve head 53 either upward to close communication between the pipe 51 and branch 49 or downward to allow hard water to flow into the tank 47 through the branch 49 while closing communication between the pipe 51 and branch 48. The tank 47 may be provided with a removable cover or manhole at or near the top to permit access to the interior for the placing of a charge of regenerating material on the bed of softening material.

To balance pressure on the opposite faces of the valve head 13 when it is in closed position against its seat 12, a by-pass pipe 54 is arranged to connect the hard water supply pipe 51 with the service pipe branch 19 of the casing 10. A needle valve indicated generally by the numeral 55 is arranged to control the rate of flow through the pipe 54. As best shown in Figs. 4 and 5, a needle member 56 of the valve 55 is formed with a restricted passage 57 extending from its inner extremity to a cross passage so that the pipe 54 is continuously in communication through this restricted passage with a device 58 on an end portion of the pipe 54 communicating with the interior of the branch 19. This needle valve member 56 is normally retained in its closed position but may be manually turned to a wide open position for back washing purposes, as hereinafter more fully described.

An injector device 58 is formed on the outlet end of the pipe 34 and is substantially conical in shape and arranged with its enlarged end opening 59 directed counter to the direction of flow of fluid from the port 18 into the branch 19 when the valve head 13 is in open position. By this arrangement I prevent the mixing of the hard water (which would otherwise enter through the pipe 54, valve 55 and passage 57) with the soft water flowing to service during the normal water softening cycle of operation. This desirable function of the injector device 58 does not interfere with the pressure balancing function of the by-pass which is in continuous communication with the branch 19 of the valve casing through the minute passage 57 in the needle valve member 56.

*Operation*

During the water softening operation the head 13 is held in closed relation to the seat 11 and the valve handle 52 is turned down so that direct communication between the hard water supply pipe 51 and the branch 48 of the valve casing is shut off and water under pressure is allowed to flow from the pipe 51 through the valve 50 to the branch 49 and thence into the upper portion of the tank 47 containing the zeolites or other softening material. Water is softened as it passes down through the softening material, then flows from the bottom of the tank 47 through connections (not shown) into the pipe 17 and branch 16 of the casing 10. The valve head 13, being open with respect to its seat 12, allows the soft water to flow from the port 18 past the valve seat 12 and out through the branch 19 into the service pipe 20. Pressure exerted by the flowing water at the open face 59 of the injector device 58 creates sufficient back pressure in the pipe 54 to prevent flow of hard water to the service pipe during the water softening operation.

When it is desired to regenerate the body of softening material in the tank 47, the valve handle 52 is first turned upward to close the head 53 against its upper seat and thereby cut off the passage of hard water to the softening tank, except for the small amount which flows through the pipe 54 and restricted passage 57. Now the tank cap or manhole cover is removed and the valve 50 allows water to drain from the top of the tank 47 through the branches 49, 48 and 21 to the drain pipe 22. Thereupon a charge of regenerating material (such as common salt or other required reagent) is placed in the tank 47 through the manhole or cover opening and the cover closed and secured in place.

To set the time control, the cap 25 of the holder 23 is removed and a control body 24 is placed in the holder 23 in contact with the head 30. Thereupon, the cap 25 is replaced and turned onto the holder 23 to force the valve head 13 to close against its seat 12 and to compress the follower spring 29, as indicated in Fig. 3. Finally the valve handle 52 is turned downward to place the hard water supply pipe 51 in communication with the upper portion of the tank 47 through the branch 49 of the valve casing. During the succeeding regenerating operation, the water flows into the top of the tank 47 dissolving the regenerating material and carrying it down through the softening material. The spent brine and hardening salts from the softening material pass into the pipe 17, thence to the valve casing branch 16, through the port 18 and passages 43 and 44 into the branch 21 and finally to waste through the drain pipe 22. The rate of flow to waste is controlled by the size of the aperture 44 in the plug 45. This operation continues until the softening material has been regenerated and washed.

My control is designed to accomplish this result and to return the apparatus to the water softening operation automatically when the control body 24 has been reduced to predetermined small size. Where this body is of such a character that its reduction in size is gradual, the valve head 13 will be held in its fully closed position relative to the seat 12 until the follower spring 29 has moved the rod 27 to a position where one of the lock nuts 28 engages the exterior surface of the cap 25. Upon further reduction of the body 24, the spring 31 is allowed to expand thereby moving the head 13 away from its seat 12 and finally causing it to close against its seat 11. When the head 13 finally closes against its seat 11, the apparatus is in the softening phase of operation during which water entering the casing 10 through the port 18 flows to the service pipe 20 rather than to the waste pipe 22. By balancing the fluid pressure on opposite faces of the head 13 during the regenerating phase of operation, I guard against holding the head 13 in contact with its seat 12 with sufficient fluid pressure to prevent the expansion of the spring 31 when pressure exerted through the control body is relieved.

In the operation of the capsule form of control body shown in Figs. 7 and 8, the wall members 33 and 34 are caused to collapse suddenly, rather than gradually, so that they allow relatively quick movement of the valve head at the end of the regenerating operation. In this case the contained substance 35 reacts with or dissolves the wall members 33 and 34 gradually but these walls do not collapse until they have been weakened to the point of being incapable of resisting the pressure exerted by the spring 40.

At the start of the regenerating operation the wall members 33 and 34 are separated and one of them is filled with the reactive substance 35 whereupon they are placed in closed telescoping relation one to the other and the capsule is inserted in the holder 36 in contact with the head 38 after removing the cap 37. Finally, by replacing the threaded cap 37 and turning it on the holder 36, pressure is exerted through the capsule sufficient to actuate the rod 39 and valve head 13a to the open position shown in Fig. 7 against the action of the spring 40. Assuming that the outlet branch 19a is connected to a service pipe or other conduit which is normally closed, fluid entering through the port 18a is thus allowed to enter the passage 12a and to flow through the aperture 44a to the outlet branch 21a. Upon collapse of the capsule the spring 40 closes the valve head 13a against the seat 11a. When this form of valve is used in connection with water softening apparatus the outlet branch 19a may be connected to the service pipe so that during the softening operation soft water enters the valve casing through the port 18a and flows directly to the service pipe while the valve head 13a is in a position to close communication between port 18a and the waste pipe connected to the branch 21a.

The capsule wall members for my mechanism may be made of a gelatin or like water-soluble substance such as that employed for the capsules commonly used for internally administered medicines and water may be used as the contained substance 35. With such capsules uniformity in the time control is promoted by excluding water from contact with the exterior surfaces of the wall members.

Periodically it may be desirable to backwash the body of water softening material in the tank 47. This may be accomplished with the apparatus shown in Figs. 1 to 4 inclusive by merely opening the needle valve 55 and turning the valve handle 52 to close the head 53 against its upper seat thereby placing the upper portion of the tank in communication with the drain pipe 22 through the branches 49 and 48. During this operation the head 13 is closed against its seat 11 so that the wash water enters the bottom of the tank through the by-pass 54, valve 55, injector device 58, branch 16 and pipe 17. To return the apparatus to the softening phase of operation the position of the valves 50 and 55 is reversed. That is to say, the head 53 of the valve 50 is closed against its lower seat and the valve 55 is closed except for the restricted passage 57.

Each of the several control bodies hereinbefore described is entirely separated from the fluid flowing in the valve passages so that the rate of reduction or softening of such bodies is not subject to variations due to variations in the temperature, pressure, velocity or chemical composition of the fluid under control. It will be evident that they may be used to control the flow of gases as well as liquids in valve passages and conduits for purposes and in arrangements differing radically from those specifically described herein without departing from the spirit of my invention, as defined in the appended claims.

Having described my invention, what I claim as new and desire to protect by Letters Patent is:

1. Valve mechanism comprising, a casing having passages for conducting fluid, a valve member movable to a predetermined position for causing the fluid to flow through a selected passage in the casing, means for actuating said member to a second position, a holder for a control body separate from said passages and valve member, and a control body adapted to collapse upon the elapse of time positioned in said holder and associated with said valve member to control its movement to the second position, said body comprising a capsule having a confining wall and containing in contact with an interior surface of said wall a substance which is reactive to said wall.

2. Valve mechanism comprising, a casing having passages for conducting fluid, a valve member movable to a predetermined position for causing the fluid to flow through a selected passage in the casing, means for actuating said member to a second position, a holder for a control body separate from said passages and valve member, and a control body adapted to collapse upon the elapse of time positioned in said holder and associated with said valve member to control its movement to the second position, said body comprising a capsule having a soluble confining wall and containing in contact with an interior surface of said wall a liquid solvent for said wall.

3. Valve mechanism comprising, a casing having passages for conducting fluid, a valve member movable to a predetermined position for causing the fluid to flow through a selected passage in the casing, means including a spring for actuating said member to a second position, a holder for a control body separate from said passages and valve members, and a control body adapted to collapse upon the elapse of time, subject to the pressure exerted by said spring in said holder and associated with said valve member to control its movement to the second position, said body comprising a capsule having soluble telescoping wall members and containing in contact with interior surfaces of said members a liquid solvent for said wall members.

LYNN G. LINDSAY.

REFERENCES CITED

The following references are of record in the file of this patent:

UNITED STATES PATENTS

| Number | Name | Date |
|---|---|---|
| 602,548 | Williams et al. | Apr. 19, 1898 |
| 749,910 | Walter | Jan. 19, 1904 |
| 907,951 | Barr | Dec. 29, 1908 |
| 1,286,485 | Addicks | Dec. 3, 1918 |
| 1,924,868 | Lovekin | Aug. 29, 1933 |
| 1,964,302 | Shelter | June 26, 1934 |
| 2,148,317 | Lisk | Feb. 21, 1939 |
| 2,159,640 | Strom | May 23, 1939 |
| 2,292,801 | Slidell | Aug. 11, 1942 |
| 2,347,202 | Lindsay | Apr. 25, 1944 |
| 2,347,203 | Lindsay | Apr. 25, 1944 |
| 2,347,204 | Lindsay | Apr. 25, 1944 |